US008413791B2

(12) United States Patent
Kennedy et al.

(10) Patent No.: US 8,413,791 B2
(45) Date of Patent: Apr. 9, 2013

(54) BOARD LUMBER POSITIONING FENCE

(75) Inventors: Russell Kennedy, Hot Springs, AR (US); Pat Conry, Hot Springs, AR (US)

(73) Assignee: Baxley Equipment Co., Hot Springs, AK (US)

( * ) Notice: Subject to any disclaimer, the term of this patent is extended or adjusted under 35 U.S.C. 154(b) by 427 days.

(21) Appl. No.: 12/855,572

(22) Filed: Aug. 12, 2010

(65) Prior Publication Data

US 2012/0037476 A1 Feb. 16, 2012

(51) Int. Cl.
*B65G 47/34* (2006.01)

(52) U.S. Cl. .................. 198/597; 198/370.02; 198/416; 198/457.01; 198/861.1

(58) Field of Classification Search ............. 198/370.02, 198/370.3, 370.07, 416, 457.01, 597, 861.1, 198/861.2, 861.6
See application file for complete search history.

(56) References Cited

U.S. PATENT DOCUMENTS

| | | | | |
|---|---|---|---|---|
| 4,136,766 | A * | 1/1979 | Pryor et al. | 198/368 |
| 4,213,525 | A * | 7/1980 | Scheppele | 198/364 |
| 5,168,978 | A * | 12/1992 | Cox et al. | 198/369.5 |
| 5,318,167 | A * | 6/1994 | Bronson et al. | 198/577 |
| 5,911,302 | A * | 6/1999 | Jackson | 198/456 |
| 6,012,568 | A * | 1/2000 | Kane | 198/817 |
| 6,382,067 | B1 * | 5/2002 | Gagnon | 83/732 |
| 6,427,097 | B1 * | 7/2002 | Martin et al. | 700/230 |
| 6,607,068 | B1 * | 8/2003 | Walther et al. | 198/456 |
| 6,892,614 | B2 * | 5/2005 | Olsen | 83/27 |
| 7,267,517 | B2 * | 9/2007 | Kinzer | 414/272 |
| 7,377,376 | B2 * | 5/2008 | Hannebauer | 198/407 |
| 7,419,047 | B2 | 9/2008 | Cesselli | |
| 7,631,746 | B2 * | 12/2009 | Bilodeau et al. | 198/416 |
| 7,793,771 | B2 * | 9/2010 | Thues et al. | 198/370.07 |
| 8,069,972 | B2 * | 12/2011 | Raybon et al. | 198/597 |
| 8,109,382 | B2 * | 2/2012 | Duperray | 198/442 |

FOREIGN PATENT DOCUMENTS

| | | |
|---|---|---|
| CA | 2191390 | 5/1997 |
| CA | 2236508 | 11/1999 |
| CA | 2241481 | 12/1999 |
| CA | 2345872 | 10/2002 |

* cited by examiner

*Primary Examiner* — Douglas Hess
(74) *Attorney, Agent, or Firm* — Jeffrey S. Melcher; Manelli Selter PLLC

(57) ABSTRACT

Provided is a positioning fence for use in lumber sawmills and method of using the positioning fence that facilitates automated positioning of lumber for cutting and a method of positioning lumber for cutting. Also provided is a retrofit position fence table and a method of using the retrofit position fence table. A continuous moving track loop has a plurality of paddles laterally positionable across the width of the track. A track moving device is used to adjust the final locked position of the paddles if the paddles are not locked in the desired position.

34 Claims, 5 Drawing Sheets

BOARD LUMBER POSITIONING FENCE

FIELD OF THE INVENTION

The invention relates to positioning fences for lumber or timber in sawmills or planermills and methods of using the positioning fences.

BACKGROUND OF THE INVENTION

In sawmills, various lumber or timber handling machinery is provided to cut and shape the lumber or timber into saleable wood products. One of the required operations in a mill, after sawing or forming to the desired cross section, is end trimming individual boards or timbers to a specified length. The term "sawmills" includes planermills.

To cut the material to length, a typical arrangement of transport equipment has a conveyor that has a lug chain table to transport the lumber pieces to length cutting saws. The lumber pieces are carried along the conveyor in equidistantly spaced succession based on the lug spacing of the lug chains. The conveyor has a set of lateral alignment rollers. The lateral alignment rollers form a roller bed system placed at right angles to the lug chain, which operate to urge one end of the lumber material toward a stop or fence, also referred to as a paddle. In this arrangement, each successive piece of lumber is spaced from the other in the direction of travel along the lumber conveyor by the lugs of the lug chain and one of the ends of the lumber is laterally aligned to the stop or fence.

The piece to be cut to length is positioned for contact with a saw or series of saws. In the configuration of sawmill conveyor equipment just described, the saws are stationary relative to the conveyor and the board is laterally positioned on the conveyor relative to the saw blade. A positioning fence, which one end of the lumber piece abuts against, controls the lateral position of the lumber piece on the feed conveyor. Numerous prior art arrangements for adjustable positioning fences for use with such a feed conveyor arrangement have been proposed in the past. For example a step positioning fence is disclosed in the published Canadian Patent application 2,241,481 of Wight et al. The stepped positioning fence of Wight has a plurality of rigid elevated faces, or steps that extend longitudinally along a side of the fence in an adjacent stepped array of differing offset spacing. The fence is oriented to present one of the steps for contact with the lumber piece to align the lumber end to the corresponding offset of that step. The lumber is urged into contact with the fence by the lateral alignment rollers resulting in alignment of the lumber end to the fence step offset. The stepped fence provides fixed incremental ending settings and a positioning mechanism to ensure the board is presented with a step suitable to obtain the desired or intended lateral translation of the board piece.

Another flexible trimmer position fence is disclosed in Canadian Patent 2,191,390 to Jackson, which discloses a board positioning fence comprised of a plurality of adjustable fence elements each staged one after the other in the downstream direction of travel of the lumber to be positioned. The lumber is urged against the positioning fence by lateral alignment or ending rollers. The ending rollers urge the lumber laterally across the feed conveyor into contact with the successive fence elements of the board positioning fence. When the desired lateral positioning of the board is achieved, lift skids are engaged to remove the lumber from contact with the lateral urging end rollers. This arrangement has multiple flexible fence elements, which are adjusted to allow the board to be ended to the desired positioning or ending location. Once the board has been displaced laterally to the desired position offset, skids are engaged that lift the positioned lumber piece away from the ending rollers.

Another arrangement to provide board lumber end positioning is disclosed in the Canadian patent 2,236,508 of Hannebauer et al. Hannebauer discloses a circulating paddle positioning fence with a flexible guide track. Actuators position the flexible guide track, which results in corresponding positioning of a paddle to a desired offset or ending position.

And yet another positioning mechanism is disclosed in the published Canadian Patent application 2,345,872 of Jobin, for apparatus for positioning pieces of wood for precise cutting. Jobin discloses an adjustable barrier, which is provided with actuators to position the barrier to the desired offset location. Various forms of adjustable barriers are shown including ones which have a face that remains perpendicular to the board as well as providing for incline planes that have a set displacement selected by an actuator to achieve an ending or offset of the lumber laterally to the desired offset amount.

A further positioning mechanism is disclosed in U.S. Pat. No. 7,419,047. This patent discloses a continuous moving track loop having a plurality of paddles laterally positionable across the width of the track. Complex mechanical brake mechanisms, positioning cams and reset cams are used to position the paddles.

It is very difficult to accurately position the paddles on the track and often the paddles are not locked at the desired location. There is a need for a device which checks the locked paddle position and adjusts the final locked paddle position.

SUMMARY OF THE INVENTION

An objective of the invention is to provide a device which checks the locked paddle position and then adjusts the locked paddle position by moving the track if the paddle is not locked in the desired position.

Another objective of the invention is to provide a device in which the paddle is locked in a rough position and the final position of the locked paddle is performed by moving the track if the locked paddle is not in the desired position.

A further objective of the invention is provide an infinite number positions for the locked paddle.

Another objective is to provide an apparatus for retrofitting conventional position fences to provide a greater accuracy of the final locked paddle position.

The invention relates to an apparatus for positioning a lumber piece comprising:

- a continuous track loop having an in-feed end and an out-feed end;
- a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber piece in a desired position perpendicular to a longitudinal direction of the track loop during use;
- a paddle locking mechanism constructed to lock the paddle in a desired position on the bearing way;
- a paddle moving device constructed to place the paddle in a desired position where the paddle is locked in position on the bearing way by the paddle locking mechanism;
- a paddle position sensor constructed to measure the position of the locked paddle;

a track moving device constructed to move at least the out-feed end of the track in a lateral direction; and a controller connected to the paddle position sensor and track moving device, the controller constructed to compare the measured position of the locked paddle to the desired position of the locked paddle and if the measured position of the locked paddle is other than the desired position the controller is constructed to activate the track moving device to move at least the out-feed end of the track so that the locked paddle is placed in the desired position.

The invention also relates to a method for positioning a lumber piece using an apparatus comprising:

a continuous track loop having an in-feed end and an out-feed end;

a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber piece within 5 inches of a desired position perpendicular to a longitudinal direction of the track loop during use;

a paddle locking mechanism constructed to lock the paddle on the bearing way;

a paddle moving device constructed to place the paddle within 5 inches of a desired position where the paddle is locked in position on the bearing way by the paddle locking mechanism;

a paddle position sensor constructed to measure the position of the locked paddle;

a track moving device constructed to move at least the out-feed end of the track in a lateral direction; and a controller connected to the paddle position sensor and track moving device, the controller constructed to compare the measured position of the locked paddle to the desired position of the locked paddle and if the measured position of the locked paddle is other than the desired position the controller is constructed to activate the track moving device to move at least the out-feed end of the track so that the locked paddle is placed in the desired position, the method comprising;

operating the track;

moving a paddle to a desired position on the bearing way;

locking the paddle in position on the bearing way using the paddle locking mechanism;

measuring the position of the locked paddle using the paddle position sensor;

comparing the position of the locked paddle to the desired position of the paddle using the controller; and if the position of the locked paddle is different from the desired position, activating the track moving device to move at least the out-feed of the track in a lateral direction and move the locked paddle to the desired position.

The invention further relates to retrofit position fence table comprising:

a table top sized and constructed to mount a position fence on top of the table top, the table top having an in-feed end and an out-feed end which correspond to an in-feed end and an out-feed end of a position fence when mounted on the table top;

a table base, the table top being mounted to the table base so that at least the out-feed end of the table top is moveable in a lateral direction;

a track moving device constructed to move at least an least the out-feed end of the table top in a lateral direction;

a paddle position sensor constructed to measure a position of a locked paddle when a position fence is mounted on the table top; and a controller connected to the paddle position sensor and track moving device, the controller constructed to compare the measured position of the locked paddle to the desired position of the locked paddle and if the measured position of the locked paddle is other than the desired position the controller is constructed to activate the track moving device to move at least the out-feed end of the table top so that the locked paddle is placed in the desired position.

The invention also relates to a method for positioning a lumber piece using an apparatus comprising:

a position fence comprising;

a continuous track loop having an in-feed end and an out-feed end;

a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber piece in a desired position perpendicular to a longitudinal direction of the track loop during use;

a paddle locking mechanism constructed to lock the paddle in a desired position on the bearing way; and a paddle moving device constructed to place the paddle in a desired position where the paddle is locked in position on the bearing way by the paddle locking mechanism; and a retrofit position table comprising:

a paddle position sensor constructed to measure the position of the locked paddle;

a table top having the position fence mounted thereon, the table top having an in-feed end and an out-feed end which correspond to the in-feed end and the out-feed end of a position fence;

a table base, the table top being mounted to the table base so that at least the out-feed end of the table top is moveable in a lateral direction;

a track moving device constructed to move at least an least the out-feed end of the table top and out-feed end of the track in a lateral direction; and a controller connected to the paddle position sensor and track moving device, the controller constructed to compare the measured position of the locked paddle to the desired position of the locked paddle and if the measured position of the locked paddle is other than the desired position the controller is constructed to activate the track moving device to move at least the out-feed end of the table top and track so that the locked paddle is placed in the desired position, the method comprising;

operating the track;

moving a paddle to a desired position on the bearing way;

locking the paddle in position on the bearing way using the paddle locking mechanism;

measuring the position of the locked paddle using the paddle position sensor;

comparing the position of the locked paddle to the desired position of the paddle using the controller; and if the position of the locked paddle is different from the desired position, activating the track moving device to move at least the out-feed end of the table top and the out-feed end of the track in a lateral direction and move the locked paddle to the desired position.

DETAILED DESCRIPTION

The inventions will now be explained with reference to the non-limiting Figures.

Figure 1:
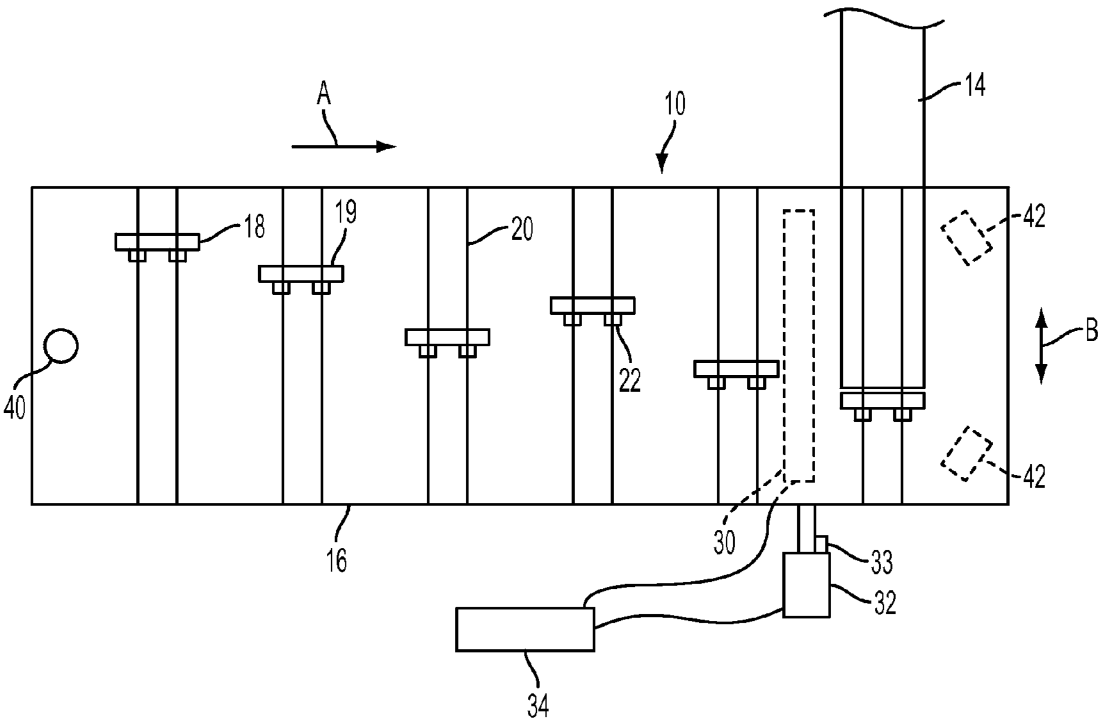
FIG. 1 is a top view of an embodiment of the positioning fence.
Figure 2:
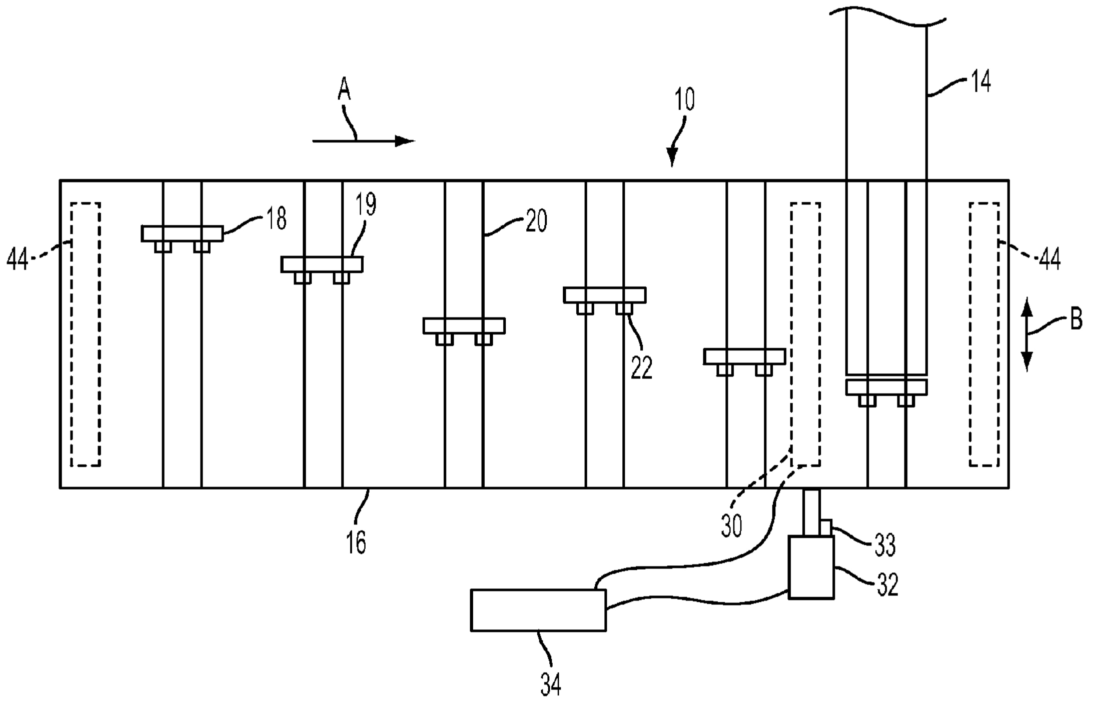
FIG. 2 is a top view of an embodiment of the positioning fence.

FIGS. 1 and 2 show embodiments of the positioning fence of the present invention. Positioning fences are now well known and any positioning fence can be modified according to the present invention. Suitable examples of positioning fences are disclosed in Canadian Patent Application Nos. 2,191,390; 2,236,508; 2,241,481; and 2,345,872; and U.S. Pat. No. 7,419,047, the complete disclosures of which are incorporated herein by reference. A preferred positioning fence is shown in my U.S. patent application Ser. No. 12/781,845, filed 18 May 2010, the complete disclosure of which is incorporated herein by reference.

The positioning fence is generally depicted by reference numeral 10. The positioning fence has a continuous loop track 16 extending between an opposed set of end rollers (not shown). The width of the track 16 is generally about 3 feet, but any desired width can be used. The top of the track 16 moves in a left to right direction, as shown by the arrow A. The track 16 includes a plurality of paddles 18 spaced along the continuous track 16 corresponding to the lumber spacing of the individual lumber pieces that the lumber position fence will be used to position. The paddles 18 have a surface 19 for interacting with the lumber pieces 14.

At least one of end rollers is driven to cause the track 16 and the paddles 18 to move in a longitudinal direction, that is in the direction of travel of the lumber 14, which is generally depicted by arrow A. An end roller can be driven by and in time with the lumber conveyor or by a separate drive that follows the movement of the lumber conveyor exactly. At least one of the paddles 18 is mounted for lateral sliding movement across the width of the track loop along a bearing way 20. The bearing way 20 is oriented for lateral movement of the paddle 18, which is a direction perpendicular to the longitudinal direction of the track 16.

The paddle 18 has a paddle locking mechanism 22 constructed and arranged to lock the lateral position of the at least one paddle. The paddle locking mechanism 22 can comprise any suitable locking mechanism. Preferably, the locking mechanism uses detents and a pin, as described in my U.S. patent application Ser. No. 12/781,845, filed 18 May 2010. Without the claimed invention, the preferred distance between detents was about 0.5 inch apart. However, with the claimed invention, the preferred distance between detents is greater than 1 inch and less than 3 inches, more preferably from 1 to 2 inches. With the present invention, the paddle 18 can be locked at a rough position, usually within 1 inch of the desired position. If the locked position is not the desired position, the present invention moves the locked paddle 18 to the desired position. Furthermore, conventional position fences 10 are limited to locked paddle 18 positions at the detents, while the present invention allows an infinite number of positions for the locked paddle 18.

As the detents become closer together, the accuracy of stopping the paddle locking mechanism 22 in the correct detent so that the locked paddle 18 is in the desired location becomes more difficult. Furthermore, if there is no detent at the desired position, the paddle 18 cannot be locked in the desired position. Moreover, when locking mechanisms 22 rely upon other methods to secure the location of the locked paddle 18, such as by friction, the paddle 18 often is not locked in the desired position. The present invention solves this problem by adding a final adjustment to the paddle 18 after the locking mechanism 22 locks the paddle in position on the bearing way 22. Thus, the present invention can be used to retrofit existing position fences 10.

The present invention incorporates a track moving device 32, such as a hydraulic, electric or pneumatic actuator, or other motorized device, which moves at least the out-feed end of the track 16 in a lateral direction shown by the arrows B. The track moving device 32 preferably includes a feedback device 33 that confirms the location of the track 16 or the table top 50. While any feedback device 33 can be used, the feedback device 33 can be for example a transducer or an encoder. Commercial examples of a track moving device 32 having a feedback device 33 includes any of the electric Moog linear motors, disclosed at www.calinear.com. A commercial example of a transducer type of feedback device 33 is the MTS temposonic transducer, disclosed at http://www.acshydraulics.com/temposonic.html. Hydraulic or pneumatic actuators can be used in conjunction with a servo or proportional valve to control the speed and position of the cylinder. The feedback device 33 is connected to the controller 34.

Figure 3:
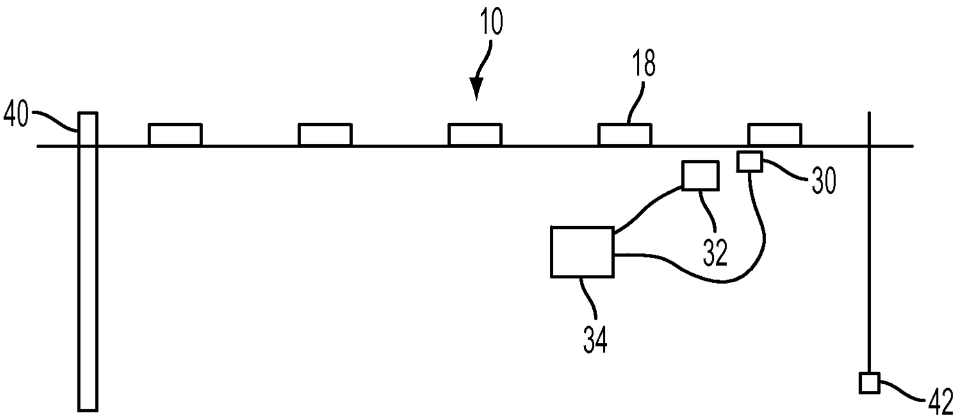
FIG. 3 is a side view of the positioning fence of FIG. 1.

In FIGS. 1 and 3, the track 16 is mounted on the in-feed end using a pivot 40 and a movable base 42 on the out-feed end. In this manner, when the track moving device 32 is activated, the out-feed end of the track 16 rotates about the pivot 40, which includes a lateral movement component, and thus the out-feed end of the track 16 moves laterally in either of the directions shown by the arrows B. The movable base 42 can be any as desired, such as wheels or slides. In this embodiment, preferably the movable base 42 uses wheels. For example, the wheels can be flat or mounted on tracks in an arc about the pivot point.

Figure 4:
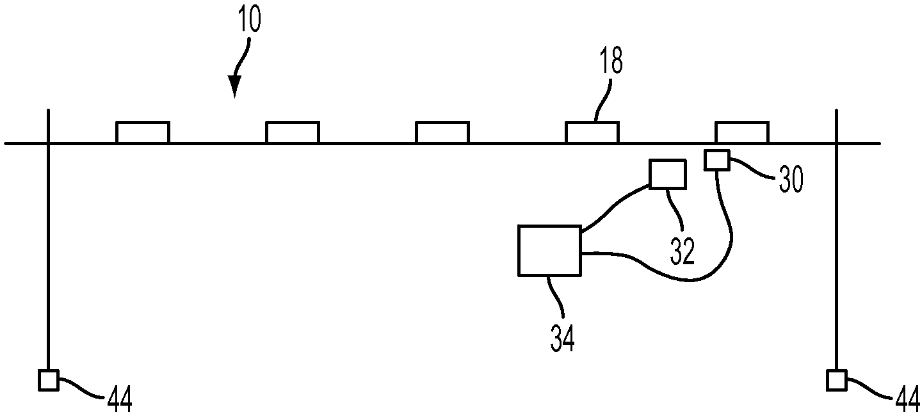
FIG. 4 is a side view of the positioning fence of FIG. 2.

In FIGS. 2 and 4, the track 16 is mounted on a movable base 44 so that both the in-feed and out-feed ends of the track 16 move laterally as shown by the arrows B. The movable base 44 can be any as desired, such as wheels, slides, or bearings. The wheels can be flat, curved, or on tracks, such as a v-track. In this embodiment, preferably the movable base 44 uses slides. The movable base 44 preferably also includes an optional rack-and-pinion 58 so that both ends of the track 16 move at the same time no matter where the track moving device 32 is mounted. The optional rack-and-pinion 58 is described with reference to FIG. 5 below, with the rack-and-pinion 58 being connected between the track 16 and the floor, such as by a metal plate 52 mounted on the floor.

Preferably, the track moving device 32 is capable of moving the track 16 at least 0.1 inch in either direction shown by the arrows B, more preferably up to 3 inches, and even more preferably up to 1 inch. In most cases, the track 16 will be moved in either of the lateral directions shown by the arrows B by 0.75 inch or less.

In the present invention, a paddle position sensor 30, such as a laser sensor, is located on the out-feed side of the track 16 and is used to determine the actual position of the locked paddle 18. A programmable computer controller 34 is used to control the operation of the paddles 18 and is connected to the paddle position sensor 30 and track moving device 32. A commercial example of the programmable computer controller 34 is an A.B. ControLogix 5000 series. However, any suitable controller 34 can be used. With the addition of a paddle position sensor 30 connected to the controller 34, the exact location of the locked paddle 18 can be determined and compared to the desired position. If the locked paddle 18 is not in the desired position, the controller 34 is constructed to activate the track moving device 32 and move the track 16 in a lateral direction so that the locked paddle 18 is located in the desired position without unlocking the paddle 18.

Figure 5:
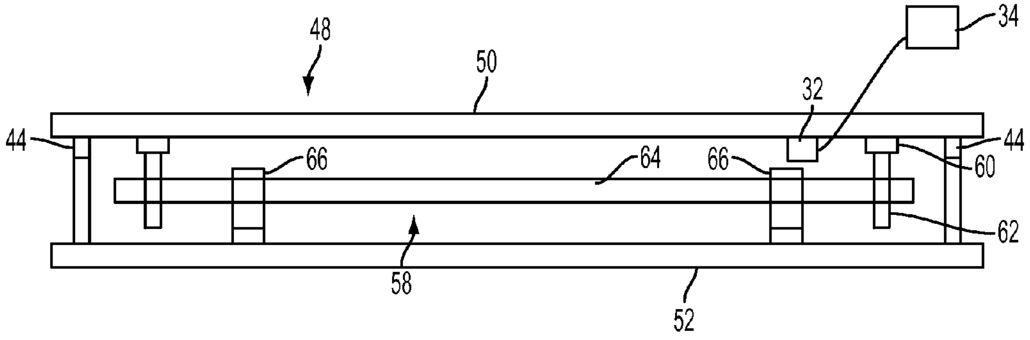
FIG. 5 is a side view of an embodiment of the retrofit positioning fence table.
Figure 6:
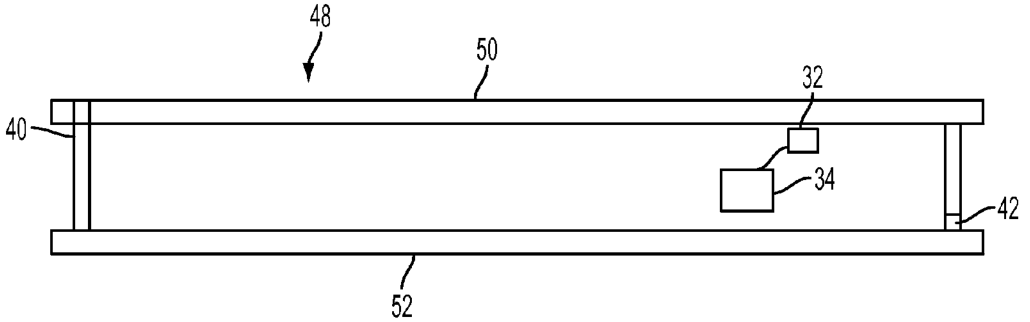
FIG. 6 is side view of an embodiment of the retrofit positioning fence table.
Figure 7:
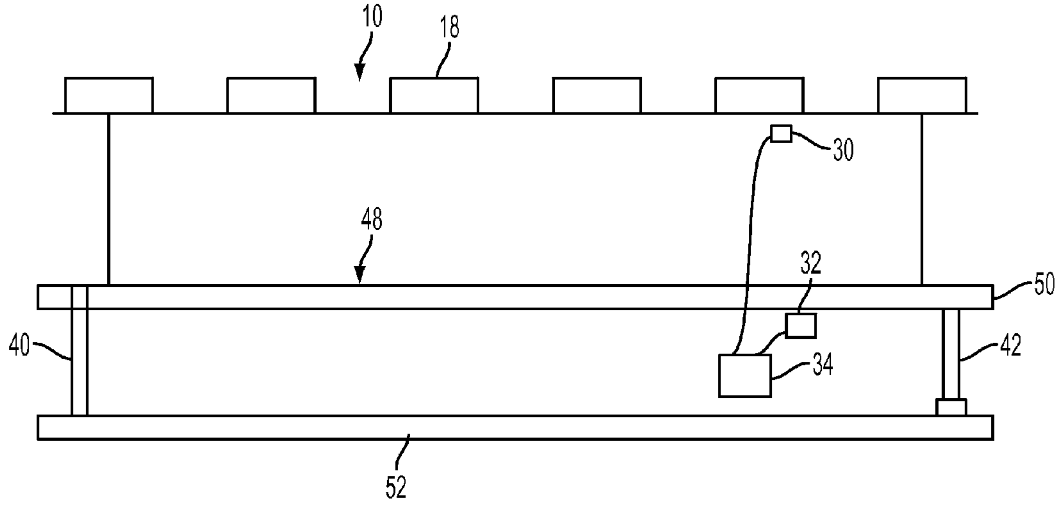
FIG. 7 is a side view of a positioning fence mounted on top of a the retrofit positioning fence of FIG. 6.

The invention also includes a retrofit position fence table 48 as shown in FIGS. 5-9. The retrofit position fence table 48 includes a table top 50 and table base 52. The table top 50 is sized and constructed to have a position fence 10 mounted thereon, as shown in FIG. 7. In this manner, conventional position fences 10 can be easily upgraded to practice the present invention.

An embodiment of the retrofit position fence table 48 is shown in FIG. 5. The table top 50 is mounted on the table bottom 52 by a movable base 44 so that both the in-feed and out-feed ends of the table top 50 move laterally, as shown by the arrows B in FIG. 9. The movable base 44 can be any as desired, such as wheels, slides, or bearings. The wheels can be flat, curved, or on tracks, such as a v-track. In this embodiment, preferably the movable base 44 uses slides. The movable base 44 preferably also includes an optional rack-and-pinion 58 so that both ends of the table top 50, and when the position fence 10 is mounted on the table top 50, both ends of the track 16 move at the same time no matter where the track moving device 32 is mounted. The rack-and-pinion 58 includes racks 60 mounted to opposite ends of the table top 50, gears 62 engaged with the racks 60, and the gears 62 being connected by an equalizer shaft 64.

Figure 8:
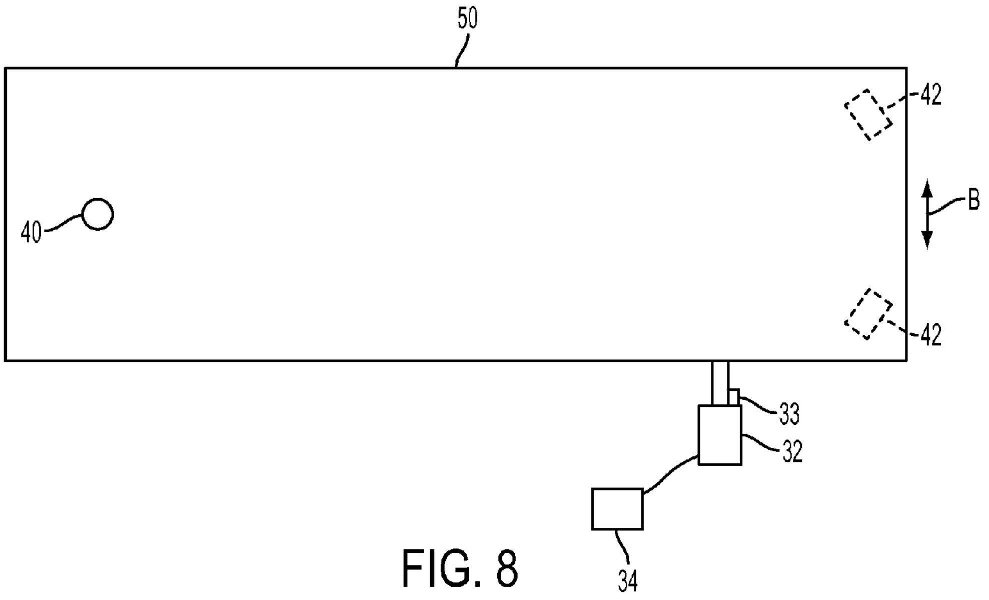
FIG. 8 is a top view of the retrofit positioning fence table of FIG. 5.
Figure 9:
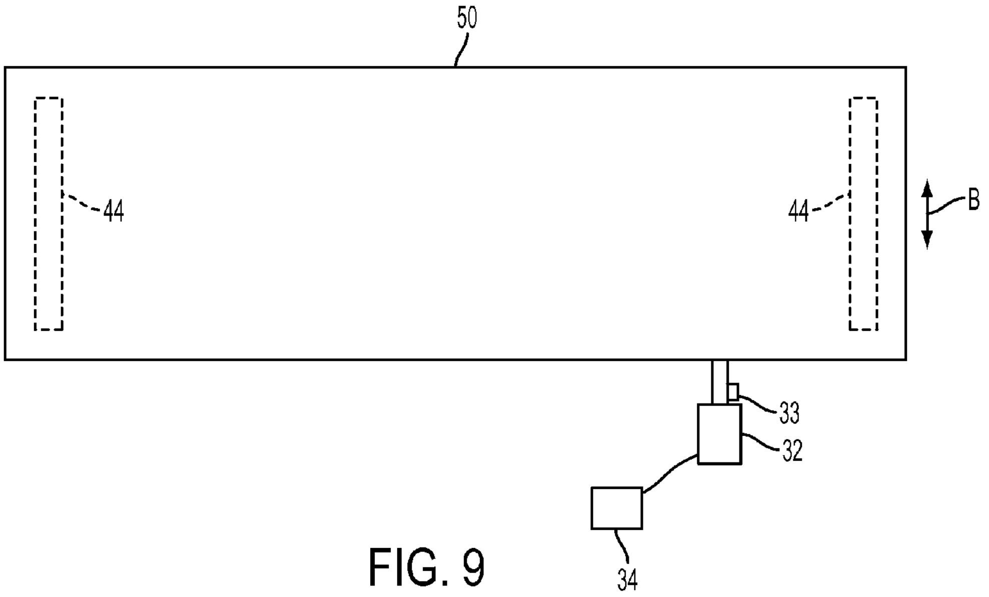
FIG. 9 is a top view of the retrofit positioning fence table of FIG. 6.

Another embodiment of the retrofit position fence table 48 is shown in FIG. 6. The table top 50 is mounted to the table bottom 52 by a pivot 40 on the in-feed end and a movable base 42 on the out-feed end. A track moving device 32 is connected to the table top 50. In this manner, when the track moving device 32 is activated and a position fence 10 is mounted on the table top 50, the out-feed end of the table top 50 rotates about the pivot 40, which includes a lateral movement component, and thus the out-feed end of the table top 50 moves laterally in either of the directions shown by the arrows B, as shown in FIG. 8. Thus, when a position fence 10 is mounted on the retrofit position fence table 48, the out-feed end of the track 16 moves laterally, as shown by the arrows B, when the track moving device 32 is activated. The movable base 42 can be any as desired, such as wheels or slides. In this embodiment, preferably the movable base 42 uses wheels. For example, the wheels can be flat or on tracks mounted in an arc about the pivot point.

The invention also relates to a method of locating a piece of lumber 14 on a conveyor that is transporting the lumber with one end of the lumber contacting the surface 19 of the paddle 18. During use, a piece of lumber 14 being transported on the conveyor is urged toward the paddle 18 traveling on track 16. The paddle 18 prevents further movement of the lumber in a direction perpendicular to the travel of the track 16 when the locking mechanism 22 is switched to a closed position which locks the paddle 18 in place on the bearing way 20. The paddle position sensor 30 determines the location of the locked paddle 18 and sends the information to the controller 34. The location of the locked paddle 18 is compared to the desired location and if the location of the locked paddle 18 is not at the desired position, the track moving device 32 is activated to move the track 16 in a lateral direction so that the locked paddle 18 is located in the desired position without unlocking the paddle 18. The position of the track 16 is confirmed by the feedback device 33. Once the locked paddle 18 is in the desired position, the lumber 14 urged against the surface 19 of the locked paddle 18 will be in the desired position. The lumber 14 will continue to be transferred downstream to a trimmer where the lumber can be cut to size. After the lumber has exited the track 16, the paddle 18 is returned to a starting position.

In another embodiment of the method, the retrofit position fence table 48 is utilized, with a position fence 10 mounted on the table top 50. During use, a piece of lumber 14 being transported on the conveyor is urged toward the paddle 18 traveling on track 16. The paddle 18 prevents further movement of the lumber in a direction perpendicular to the travel of the track 16 when the locking mechanism 22 is switched to a closed position which locks the paddle 18 in place on the bearing way 20. The paddle position sensor 30 determines the location of the locked paddle 18 and sends the information to the controller 34. The location of the locked paddle 18 is compared to the desired location and if the location of the locked paddle 18 is not at the desired position, the track moving device 32 is activated to move the table top 50 and track 16 in a lateral direction so that the locked paddle 18 is located in the desired position without unlocking the paddle 18. The position of the table top 50 or track 16 is confirmed using the feedback device 33. Once the locked paddle 18 is in the desired position, the lumber 14 urged against the surface 19 of the locked paddle 18 will be in the desired position. The lumber 14 will continue to be transferred downstream to a trimmer where the lumber can be cut to size. After the lumber has exited the track 16, the paddle 18 is returned to a starting position.

While the claimed invention has been described in detail and with reference to specific embodiments thereof, it will be apparent to one of ordinary skill in the art that various changes and modifications can be made to the claimed invention without departing from the spirit and scope thereof.

We claim:

1. An apparatus for positioning a lumber piece comprising:

a continuous track loop having an in-feed end and an out-feed end;

a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber piece in a desired position perpendicular to a longitudinal direction of the track loop during use;

a paddle locking mechanism constructed to lock the paddle in a desired position on the bearing way;

a paddle moving device constructed to place the paddle in a desired position where the paddle is locked in position on the bearing way by the paddle locking mechanism;

a paddle position sensor constructed to measure the position of the locked paddle;

a track moving device constructed to move at least the out-feed end of the track in a lateral direction; and a controller connected to the paddle position sensor and track moving device, the controller constructed to compare a measured position of the locked paddle to the desired position of the paddle and if the measured position of the paddle is other than the desired position the controller is constructed to activate the track moving device to move at least the out-feed end of the track so that the paddle is placed in the desired position.

2. The apparatus according to claim 1, further comprising a pivot located at the in-feed end of the track and a movable base at the out-feed end of the track, such that when the track moving device is activated the out-feed end of the track pivots around the pivot and moves the out-feed end of the track in a lateral direction.

3. The apparatus according to claim 2, wherein the movable base comprises a wheel.

4. The apparatus according to claim 1, further comprising a movable base located at the in-feed end of the track and at the an—out feed end of the track, such that when the track moving device is activated the entire track moves in a lateral direction.

5. The apparatus according to claim 4, wherein the movable base comprises a slide and the apparatus further comprises a rack-and-pinion between the track and the floor.

6. The apparatus according to claim 1, wherein the track moving device is constructed to move at least the out-feed end of the track at least 0.1 inches in a lateral direction.

7. The apparatus according to claim 1, wherein the track moving device comprises a hydraulic, electric or pneumatic actuator.

8. The apparatus according to claim 1, wherein the track moving device comprises a feedback device that confirms the location of the track.

9. A retrofit position fence table comprising:

a table top sized and constructed to mount a position fence on top of the table top, the table top having an in-feed end and an out-feed end which correspond to an in-feed end and an out-feed end of a position fence when mounted on the table top;

a table base, the table top being mounted to the table base so that at least the out-feed end of the table top is moveable in a lateral direction;

a track moving device constructed to move at least an least the out-feed end of the table top in a lateral direction;

a paddle position sensor constructed to measure a position of a locked paddle when a position fence is mounted on the table top; and a controller connected to the paddle position sensor and track moving device, the controller constructed to compare a measured position of the locked paddle to a desired position of the locked paddle and if the measured position of the locked paddle is other than the desired position the controller is constructed to activate the track moving device to move the track so that the locked paddle is placed in the desired position.

10. The retrofit position fence table according to claim 9, further comprising a pivot located at the in-feed end of the table top and a movable base at the out-feed end of the table top, such that when the track moving device is activated the out-feed end of the table top pivots around the pivot and moves the out-feed end of the table top in a lateral direction.

11. The retrofit position fence table according to claim 10, wherein the movable base comprises a wheel.

12. The retrofit position fence table according to claim 9, further comprising a movable base located at the in-feed end of the table top and at the—out feed end of the table top, such that when the track moving device is activated the entire table top moves in a lateral direction.

13. The retrofit position fence table according to claim 12, wherein the movable base comprises a slide and the apparatus further comprises a rack-and-pinion between the track and the floor.

14. The retrofit position fence table according to claim 9, wherein the track moving device is constructed to move at least the out-feed end of the table top at least 0.1 inches in a lateral direction.

15. The retrofit position fence table according to claim 9, wherein the track moving device comprises a hydraulic, electric or pneumatic actuator.

16. The retrofit position fence table according to claim 9, wherein the track moving device comprises a feedback device that confirms the location of the track.

17. The retrofit position fence table according to claim 9, further comprising a position fence mounted on the table top.

18. A method for positioning a lumber piece using an apparatus comprising:

a continuous track loop having an in-feed end and an out-feed end;

a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber piece in a desired position perpendicular to a longitudinal direction of the track loop during use;

a paddle locking mechanism constructed to lock the paddle in a desired position on the bearing way;

a paddle moving device constructed to place the paddle in a desired position where the paddle is locked in position on the bearing way by the paddle locking mechanism;

a paddle position sensor constructed to measure the position of the locked paddle;

a track moving device constructed to move at least the out-feed end of the track in a lateral direction; and a controller connected to the paddle position sensor and track moving device, the controller constructed to compare a measured position of the locked paddle to the desired position of the paddle and if the measured position of the locked paddle is other than the desired position the controller is constructed to activate the track moving device to move at least the out-feed end of the track so that the locked paddle is placed in the desired position, the method comprising;

operating the track;

moving a paddle to a desired position on the bearing way;

locking the paddle in position on the bearing way using the paddle locking mechanism;

measuring the position of the locked paddle using the paddle position sensor;

comparing the position of the locked paddle to the desired position of the paddle using the controller; and if the position of the locked paddle is different from the desired position, activating the track moving device to move at least the out-feed end of the track in a lateral direction and move the locked paddle to the desired position.

19. The method according to claim 18, further comprising a pivot located at the in-feed end of the track and a movable base at the out-feed end of the track, the method further comprising activating the track moving device so that the out-feed end of the track pivots around the pivot and moves the out-feed end of the track in a lateral direction.

20. The method according to claim 19, wherein the movable base comprises a wheel.

21. The method according to claim 18, further comprising a moveable base located at the in-feed end of the track and at the out-feed end of the track, the method further comprising activating the track moving device so that the track moves in a lateral direction.

22. The method according to claim 21, wherein the movable base comprises a slide and the apparatus further comprises a rack-and-pinion between the track and the floor.

23. The method according to claim 18, wherein the track moving device moves at least the out-feed end of the track at least 0.1 inches in a lateral direction.

24. The method according to claim 18, wherein the track moving device comprises a hydraulic, electric or pneumatic actuator.

25. The method according to claim 18, wherein the track moving device comprises a feedback device that confirms the location of the track and the feedback device provides information regarding the location of the track to the controller.

26. The method according to claim 18, wherein the paddle is locked into a rough position and the final position of the locked paddle is adjusted by moving the track if the locked paddle is not in the desired location.

27. A method for positioning a lumber piece using an apparatus comprising:

a position fence comprising;

a continuous track loop having an in-feed end and an out-feed end;

a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber piece in a desired position perpendicular to a longitudinal direction of the track loop during use;

a paddle locking mechanism constructed to lock the paddle in a desired position on the bearing way; and a paddle moving device constructed to place the paddle in a desired position where the paddle is locked in position on the bearing way by the paddle locking mechanism; and a retrofit position table comprising:

a paddle position sensor constructed to measure the position of the locked paddle;

a table top having the position fence mounted thereon, the table top having an in-feed end and an out-feed end which correspond to the in-feed end and the out-feed end of a position fence;

a table base, the table top being mounted to the table base so that at least the out-feed end of the table top is moveable in a lateral direction;

a track moving device constructed to move at least an least the out-feed end of the table top and out-feed end of the track in a lateral direction; and a controller connected to the paddle position sensor and track moving device, the controller constructed to compare a measured position of the locked paddle to the desired position of the locked paddle and if the measured position of the locked paddle is other than the desired position the controller is constructed to activate the track moving device to move at least the out-feed end of the table and the track so that the locked paddle is placed in the desired position, the method comprising;

operating the track;

moving a paddle to a desired position on the bearing way;

locking the paddle in position on the bearing way using the paddle locking mechanism;

measuring the position of the locked paddle using the paddle position sensor;

comparing the position of the locked paddle to the desired position of the paddle using the controller; and if the position of the locked paddle is different from the desired position, activating the track moving device to move at least the out-feed end of the table top and the out-feed end of the track in a lateral direction and move the paddle to the desired position.

28. The method according to claim 27, further comprising a pivot located at the in-feed end of the table top and a movable base at the out-feed end of the table top, the method further comprising activating the track moving device so that the out-feed end of the track pivots around the pivot and moves the out-feed end of the track in a lateral direction.

29. The method according to claim 28, wherein the movable base comprises a wheel.

30. The method according to claim 27, further comprising a moveable base located at the in-feed end of the table top and at the out-feed end of the table top, the method further comprising activating the track moving device so that the track moves in a lateral direction.

31. The method according to claim 30, wherein the movable base comprises a slide and the apparatus further comprises a rack-and-pinion between the table top and the table bottom.

32. The method according to claim 27, wherein the track moving device moves at least the out-feed end of the table at least 0.1 inches in a lateral direction.

33. The method according to claim 27, wherein the track moving device comprises a hydraulic, electric or pneumatic actuator.

34. The method according to claim 27, wherein the track moving device comprises a feedback device that confirms the location of the table top or track and the feedback device provides information regarding the location of the table top or track to the controller.

* * * * *